Patented Oct. 26, 1937

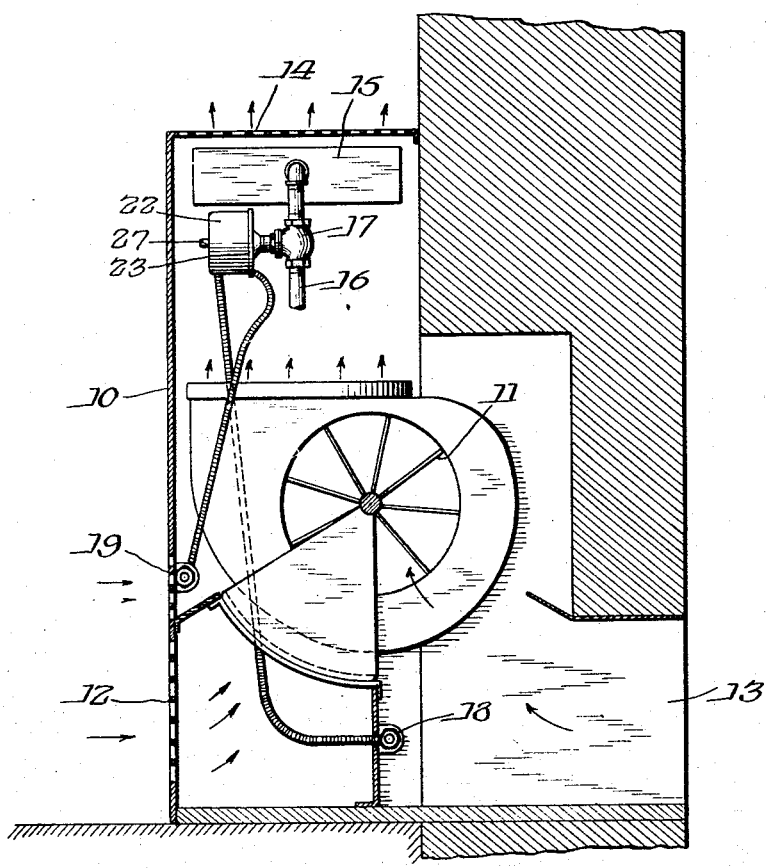
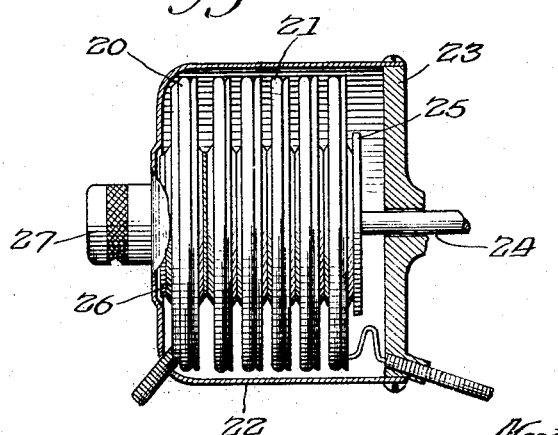

2,097,311

UNITED STATES PATENT OFFICE 2,097,311

THERMOSTATIC CONTROL FOR HEAT VALVES

Morton O. Snediker, Chicago, Ill., assignor to The Powers Regulator Company, Chicago, Ill., a corporation of Illinois Application May 27, 1935, Serial No. 23,582

4 Claims. (Cl. 236—91)

My invention relates to thermostatic means for controlling a supply of heat to a space, the control being correlated to outside temperatures. The device is primarily intended for application to the so-called "unit heaters" or "unit ventilators", but is of general application when modified as required for other conditions.

The operation of unit heaters, particularly of the type illustrated in my prior patent, Re-issue No. 18,875, is generally satisfactory, but there is still something remaining to be improved therein. The difficulty may be explained as follows: the temperature change necessary to move the heat control valve from fully open to fully closed position is approximately six degrees; thus, for a thermostat set at seventy degrees the room may be maintained at that temperature during mild, cold weather, with a comparatively small valve opening. However, if the outside temperature drops materially and a wider valve opening is necessary in order to supply sufficient heat, the wider valve opening is obtained at the cost of a temperature drop, in an extreme case, to around sixty-seven degrees in the room, which is objectionable.

I am aware that many arrangements have been proposed in which the differential of indoor and outdoor thermostats is used for positioning a heat valve, but such arrangements are not satisfactory in the present case. To secure the proper result, the heat valve should be actually positioned by either thermostat, independently; that is to say, the valve should be opened or closed an amount roughly corresponding to variations in outdoor temperatures without changing the adjustment or operative effect of the indoor thermostat on the valve.

I am aware also of an arrangement, known as the master and sub-master type, disclosed in my prior Patent No. 1,530,917, in which arrangement the adjustment of one thermostat is changed by the other thermostat. Such an arrangement would not be entirely satisfactory under the conditions described herein.

The desired result is secured by providing a pair of bellows in end to end relation, the end wall of one bellows serving to actuate the heat control valve, and connecting said bellows to thermostats, one within and one without the space to be heated. In this manner the heat control valve is, for all practical purposes, moved independently by either of the thermostats, and the adjustment of the indoor thermostat is not materially changed by a change in the conditions reflected by the outdoor thermostat.

I have stated that the outdoor thermostat does not change the adjustment of the other thermostat, such adjustment being affected manually. In the practical application of the idea here disclosed the bellows that is responsive to the outdoor thermostat is selected in order to give a pre-determined result. The size or capacity of the bellows and the degree of resistance to internal pressure are fixed in order to effect the desired result as to extent and ratio of change resulting from a change in outdoor conditions.

It will be understood that in the broader claims I contemplate the inclusion of equivalent elements, such as thermostats and hygrostats.

My invention will be more readily understood by reference to the accompanying drawing, in which:

Fig. 1 is a vertical, sectional view through a conventional unit heater, having my apparatus applied thereto, and;

Fig. 2 is an enlarged sectional view through the control bellows.

In the drawing I have shown the improvement as applied to a unit heater, including a casing 10, containing a motor driven blower 11, the casing having an inlet 12 for re-circulated air, an inlet 13 for fresh air, and an outlet 14 for heated air. Heat is supplied to the heat exchange element 15 through the pipe 16, the supply of heat being governed by the valve 17.

Control of the valve 17 is effected by two thermostatic elements which may be in the form of bulbs 18—19, the former located in the fresh air inlet 13, and the latter in the re-circulated air inlet 12. The bulbs are connected by a flexible tube to a pair of bellows 20—21 respectively, mounted in end to end relation within a housing 22. The housing is fixed to a base 23, suitably secured to the valve body, the valve stem 24 projecting through the base 23 and terminating in a disc 25 that lies against the movable end wall of the bellows 21. It will be noted that the bellows 20—21 are placed in abutting relation, the outer wall of the bellows 20 being held rigidly against a plate 26, the position of which is determined by an adjusting screw 27.

The operation is as follows, assuming that the proper adjustments have been made in order to secure a pre-determined room temperature; following, for example, an increase in outdoor temperature, the increased vapor tension effective in the bellows 20 will bodily move the bellows 21 and the valve stem 24 toward a more restricted position of the valve without materially changing the relation of the thermostatic element 19 and the bellows 21. Thereafter, assuming a drop in room temperature, the vapor tension in the bellows 21 will be lessened, and the steam valve will be correspondingly opened. If, without change in the room temperature, the outdoor temperature should drop, the bellows 20 will be partially collapsed, permitting the bellows 21 and the steam valve operated thereby to bodily move toward a more fully open position. Thus an increased amount of steam will be available in the heat exchange element to compensate for the lowered fresh air temperature.

It should be noted that the operation of the apparatus is not that of a bellows subject to the differential of two combined fluid pressures, but that, in effect, each of the thermostats acts independently on the steam valve. It should be noted also that one thermostat does not change the adjustment of the other thermostat.

While I have illustrated the invention in connection with a unit heater, and have utilized the so-called self-contained thermostats, the idea is applicable to other forms of gradual acting, fluid pressure thermostats in other arrangements.

It should be understood that while I have described and shown a thermostat exposed to outdoor air, I contemplate any construction in which the respective thermostat is influenced by outdoor temperatures whether or not actually located out-of-doors.

I claim:

1. In combination, a heat exchange element for supplying heat to a space, a valved pipe for supplying heat to said element, a thermostatic bulb in said space and a thermostatic bulb so placed as to be subject to outdoor temperature, a pair of bellows adapted to receive fluid under pressure for operating the valve in said pipe, said bellows being mounted in end to end relation, the outer wall of one bellows being connected to said valve for operating the same, and separate connections from each thermostat to the respective bellows, the bellows, the outer wall of which is connected to said valve being in communication with said indoor thermostat, and the other bellows with said outdoor thermostat, whereby the position of the inner wall of said indoor bellows is changed according to outdoor temperatures, said bulbs and bellows being in open communication.

2. In combination, a casing having an air outlet opening and two air inlet openings, one of the latter being connected to the space the temperature of which is to be controlled, and the other connected to the outside air, a heat exchange element in said casing, a valve for controlling the supply of heat to said element, a pair of bellows in end to end relation, the end wall of one bellows being connected to said valve, and a pair of bulbs connected to said bellows, each independent of the other, one bulb being located in a space subject to the temperature of the space to be heated, and the other bulb subject to the temperature of the outside air, the bellows, the outer wall of which is connected to said valve being in communication with said indoor thermostat, and the other bellows with said outdoor thermostat, whereby the position of the inner wall of said indoor bellows is changed according to outdoor temperatures, said bulbs being in open communication with said bellows.

3. In combination, a heat exchange element for supplying heat to a space, a valved pipe for supplying heat to said element, a thermostatic bulb in said space and a thermostatic bulb so placed as to be subject to outdoor temperature, a pair of bellows adapted to receive fluid under pressure for operating the valve in said pipe, said bellows being mounted in end to end relation, the outer wall of one bellows being connected to said valve for operating the same, and separate connections from each thermostat to the respective bellows, the bellows, the outer wall of which is connected to said valve being in communication with said indoor thermostat and the other bellows with said outdoor thermostat whereby the position of the inner wall of said indoor bellows is changed according to outdoor temperatures, said bulbs and bellows being in open communication, the bellows connected to the outdoor thermostat being of substantially less capacity than the other bellows.

4. In combination, a casing having an air outlet opening and two air inlet openings, one of the latter being connected to the space the temperature of which is to be controlled, and the other connected to the outside air, a heat exchange element in said casing, a valve for controlling the supply of heat to said element, a pair of bellows in end to end relation, the end wall of one bellows being connected to said valve, and a pair of bulbs connected to said bellows, each independent of the other, one bulb being located in a space subject to the temperature of the space to be heated, and the other bulb subject to the temperature of the outside air, the bellows, the outer wall of which is connected to said valve being in communication with said indoor thermostat, and the other bellows with said outdoor thermostat, whereby the position of the inner wall of said indoor bellows is changed according to outdoor temperatures, said bulbs being in open communication with said bellows, the bellows connected to the outdoor thermostat being of substantially less capacity than the other bellows.

MORTON O. SNEDIKER.